(12) United States Patent
Mukhtarov et al.

(10) Patent No.: US 11,614,553 B2
(45) Date of Patent: Mar. 28, 2023

(54) FIBER OPTIC CABLE DEPTH CALIBRATION AND DOWNHOLE APPLICATIONS

(71) Applicant: Halliburton Energy Services, Inc., Houston, TX (US)

(72) Inventors: Timur Mukhtarov, Calgary (CA); Zhao Zheng, Cypress, TX (US); Henry Clifford Bland, Calgary (CA); Aleksandar Jeremic, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 522 days.

(21) Appl. No.: 16/729,732

(22) Filed: Dec. 30, 2019

(65) Prior Publication Data
US 2021/0199826 A1 Jul. 1, 2021

(51) Int. Cl.
*G01V 1/22* (2006.01)
*G01V 1/36* (2006.01)

(52) U.S. Cl.
CPC ............. *G01V 1/226* (2013.01); *G01V 1/36* (2013.01)

(58) Field of Classification Search
CPC .................................. G01V 1/226; G01V 1/36
See application file for complete search history.

(56) References Cited

U.S. PATENT DOCUMENTS

| 8,379,934 B2* | 2/2013 | Jasinski | H04N 5/2327 |
| | | | 348/229.1 |
| 9,453,821 B2 | 9/2016 | Minto et al. | |
| 2008/0264631 A1 | 10/2008 | Mendez et al. | |
| 2009/0202192 A1 | 8/2009 | Taverner et al. | |
| 2013/0070247 A1* | 3/2013 | Funamoto | G01J 3/26 |
| | | | 356/416 |
| 2013/0279841 A1 | 10/2013 | Joinson | |

(Continued)

FOREIGN PATENT DOCUMENTS

WO 2017078536 5/2017

OTHER PUBLICATIONS

David R. Johnson, "Using Weights in the Analysis of Survey Data", Nov. 2008, The Pennsylvania state University (Year: 2008).*

(Continued)

*Primary Examiner* — Natalie Huls
*Assistant Examiner* — Sharad Timilsina
(74) *Attorney, Agent, or Firm* — Kilpatrick Townsend & Stockton LLP

(57) ABSTRACT

A fiber optic cable positioned along a casing string in a wellbore may be calibrated by exciting a tube wave in the wellbore and detecting, by the fiber optic cable, a reflected tube wave. The reflected tube wave may correspond to a reflection of the tube wave off an obstacle within the wellbore. The obstacle may have a known location such that a reference point along the fiber optic cable may be associated with the known location of the obstacle for calibrating the fiber optic cable. Downhole applications utilizing data collected by the calibrated fiber optic cable, including location data, may weight the data collected based at least in part on an uncertainty value associated with a particular calibrated location along the length of the fiber optic cable.

19 Claims, 13 Drawing Sheets

(56) References Cited

U.S. PATENT DOCUMENTS

| | | | |
|---|---|---|---|
| 2015/0346370 A1* | 12/2015 | Martin | G01N 29/2418 |
| | | | 73/152.58 |
| 2016/0245946 A1* | 8/2016 | Kalyanraman | E21B 47/005 |
| 2017/0075029 A1* | 3/2017 | Cuny | G01V 1/52 |
| 2017/0135056 A1* | 5/2017 | Sorrentino | H04W 56/0015 |
| 2018/0031734 A1* | 2/2018 | Sarkar | G01V 1/52 |
| 2019/0004195 A1 | 1/2019 | Hornman et al. | |

OTHER PUBLICATIONS

Dean et al., Depth calibration of fibre-optic distributed vibration sensing measurements, First Break, vol. 36, No. 3, Mar. 2018, pp. 29-34.

Ellmauthaler et al., Depth calibration for DAS VSP Lessons learned from two field trials, SEG Technical Program Expanded Abstracts, 2016.

Madsen et al., Data-driven depth calibration for distributed acoustic sensing,The Leading Edge, 2016, pp. 610-614.

Mateeva et al., Depth Calibration of DAS VSP Channels: a New Data Driven Method, 79th EAGE Conference and Exhibition, 2017.

Banack et al., "Characterization of Flow Control Device Performance with Distributed Fiber-Optic Sensors", SPE-195869-MS, 2019, pp. 1-20.

Halliburton et al., "Comparing Distributed Acoustic Sensing, Vertical Seismic Profile Data Acquired with Single-and Multi-Mode Fiber Optic Cables", SEG International Exposition and 88th Annual Meeting, 2018, pp. 4674-4677.

Halliburton et al., "Quantitative Real-Time DAS Analysis for Plug-and-Perf Completion Operation", Unconventional Resources Technology Conference, Austin, Texas, Jul. 24-26, 2017, pp. 1-9.

Hull et al., "Case History of DAS Fiber-Based Microseismic and Strain Data, Monitoring Horizontal Hydraulic Stimulations Using Various Tools to Highlight Physical Deformation Processes (Part A)", Unconventional Resources Technology Conference, Austin, TX, Jul. 24-26, 2017, pp. 1-13.

Karrenbach et al., "Fiber-Optic Distributed Acoustic Sensing of Microseismicity, Strain and Temperature During Hydraulic Fracturing", Geophysics, vol. 84, No. 1 (Jan.-Feb. 2019), pp. D11-D23.

Application No. PCT/US2019/068908, International Search Report and Written Opinion, dated Sep. 25, 2020, 9 pages.

\* cited by examiner

FIBER OPTIC CABLE DEPTH CALIBRATION AND DOWNHOLE APPLICATIONS

TECHNICAL FIELD

The present disclosure relates generally to a fiber optic cable placed along a length of a wellbore for collecting data associated with the downhole environment, and more particularly (although not necessarily exclusively), to calibration of a depth of various reference points along a length of the fiber optic cable. The calibrated fiber optic cable may then be used in various downhole applications.

BACKGROUND

A fiber optic cable may be positioned downhole along a length of a wellbore of a well system for collecting data associated with the downhole environment. The fiber optic cable may not extend in a straight line from a surface of the wellbore to an end of the fiber optic cable. Instead, the fiber optic cable can have slack between clamps, can wind around a tubing string (e.g. a casing string), and may include extra lengths of optical fibers within a fiber splice housing. Thus, it can be difficult to accurately determine a depth of a particular reference point along the length of the fiber optic cable. Accuracy in calibrating the depth of various reference points along the length of the fiber optic cable can improve the functionality of the well system.

DETAILED DESCRIPTION

Figure 1:
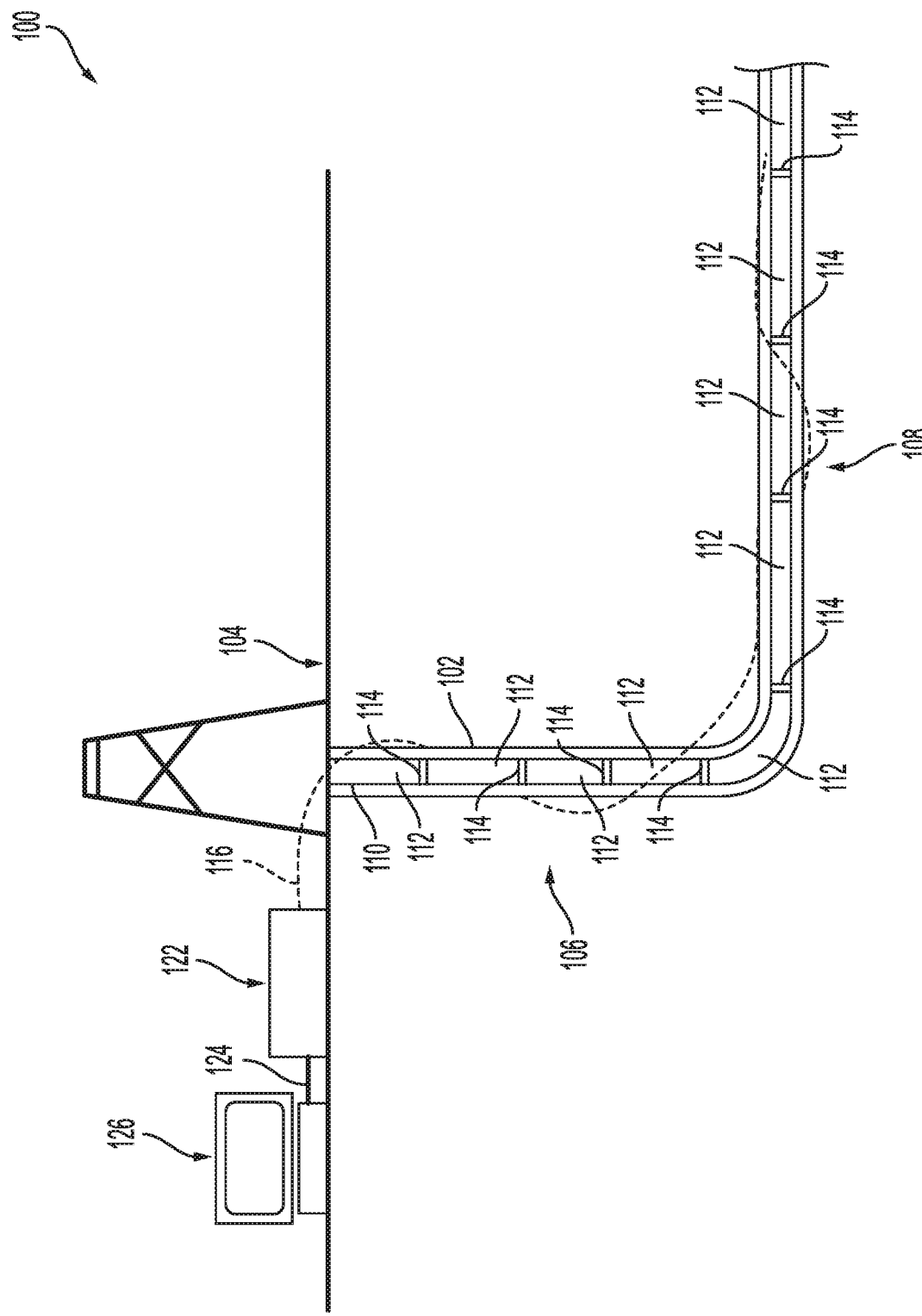
FIG. 1 is a schematic illustration of a well system including a system for calibrating a fiber optic cable downhole, according to one aspect of the present disclosure.

Certain aspects and features relate to a method of calibrating a length of a fiber optic cable positioned downhole along a length of a wellbore of a well system. Calibrating the fiber optic cable can aid in more accurately determining a physical location (e.g. depth) of a particular reference point along the length of the fiber optic cable. The uncertainty magnitude associated with a reference point along the fiber optic cable may also be determined. The uncertainty magnitude associated with each reference point can be used to improve the results of applications relying upon the location of reference points along the fiber optic cable.

In some aspects, the fiber optic cable may be a fiber in metal tube ("FIMT") which includes multiple optical fibers positioned within a metal tube (e.g. a stainless steel tube) for protecting the optical fibers. The optical fibers may be optical sensors for measuring a characteristic within the downhole environment, including but not limited to strain, temperature, pressure, light, etc. The fiber optic cable may extend from a surface of the wellbore along the length of the wellbore. For example it may be positioned around a casing string positioned within the wellbore. The fiber optic cable may not have the same length as the casing string or the wellbore in which it is positioned. For example, the fiber optic cable may wrap loosely around the casing string, there may be slack in the length of the fiber optic cable, or the optical fibers of the fiber optic cable may be loosely positioned within the metal tube such that the optical fibers may have a greater total length than the metal tube itself. Thus, it may be difficult to determine a depth of a particular point along the length of the fiber optic cable. A particular point along the length of the fiber optic cable may also be referred to as a sensor positioned along the length of the fiber optic cable.

According to some aspects of the present disclosure, a fiber optic cable may be calibrated by associating multiple reference points along the length of the fiber optic cable with certain obstacles of the casing string that have known depths. Thus, the location (e.g. depth downhole) of each of the multiple reference points may be determined (or calibrated) by associating each reference point with an obstacle having a known location (e.g. depth downhole). In some aspects, a tube wave may be generated downhole and reflections of the tube wave off the various known obstacles in the wellbore may be used to calibrate the fiber optic cable by associating (or matching or calibrating) respective reference points with various obstacles within the wellbore. In some aspects, the known obstacles may be features of the well system's design that have known depths. For example, the design of the casing string may be known, including the diameter of the casing string from heel to toe of the casing string, the number of casing joints, the length of each casing joint, the layout/organization of casing joints, the location of casing collars connecting the casing joints, the diameter of each casing joint, the diameter at each casing collar, as well as the existence and location of other obstacles (e.g. downhole tools or equipment). Because the design of the casing string is known, the depth of the various features or obstacles associated with the casing string may also be known or determined. Obstacles include features that cause impedance discontinuity, for example a feature that causes a step-wise velocity change to a tube wave (e.g. a change in cement density in the annulus, a change in diameter of a casing string, a change in thickness of a casing string, etc.).

In some aspects, for calibrating the fiber optic cable, a tube wave may be excited within the wellbore at a known or an unknown location. The tube wave may propagate through the wellbore including within the fluid in the inner region of the casing string. Sensors that make up the fiber optic cable may sense the tube wave as it propagates along the length of the wellbore and along the length of the fiber optic cable. Data associated with the tube wave's propagation may be transmitted from the fiber optic cable to a distributed acoustic sensing ("DAS") system. The DAS system may monitor and analyze the data collected by the fiber optic cable. The tube wave may also reflect off obstacles in the wellbore. The tube wave's reflection off an obstacle may be detected by the fiber optic cable. The location of the obstacle downhole may therefore correspond to a reference point along a length of the fiber optic cable corresponding to the location along the fiber optic cable where the cable sensed the tube wave reflected off the obstacle. The obstacle may be determined to be a known obstacle based on the data collected by the DAS system and the knowledge of the casing string's design. Thus, the reference point along the fiber optic cable may be associated with a particular obstacle, for example, a change in diameter of the casing string at a known location. The location (i.e. depth) of the obstacle may be known based on the design of the casing string. The location (i.e. depth) of the reference point along the length of the fiber optic cable may therefore correspond to the location of the obstacle. Multiple obstacles may be known within the wellbore and data collected by the DAS system related to the tube wave and the reflection of the tube wave off various obstacles may be used to calibrate the fiber optic cable. Thus, reference points along the length of the fiber optic cable may be matched or associated with known locations within the wellbore. Upon matching a reference point with a known location, the reference point may be referred herein to a "calibrated reference point."

An uncertainty magnitude associated with a calibrated reference point may be determined based at least in part on imaging a tube wave and one or more reflections of the tube wave off one or more obstacles. The uncertainty magnitude of a calibrated reference point may be used to weight to the calibrated reference point when the calibrated reference point is utilized in a later well system or application, for example during microseismic mapping of a wellbore using the calibrated fiber optic cable. Knowing the fiber optic cable's trajectory within the wellbore may improve automation on the various stages of monitoring of the wellbore, including velocity model optimization and automatic event detection and location estimation. These improvements can minimize the amount of human resources required and can decrease costs while increasing efficiency while providing valuable timely feedback to a wellbore system. Wellbore systems that may utilize the calibration and uncertainty methods described for calibrating the fiber optic cable include but are not limited to a wellbore fracking system.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 depicts a well system 100 having a wellbore assembly according to one aspect. The well system 100 includes a borehole that is a wellbore 102 extending through a surface 104 and various earth strata. The wellbore 102 has a substantially vertical section 106 and a substantially horizontal section 108. The substantially vertical section 106 and the substantially horizontal section 108 can include a casing string 110 extending along a length of the wellbore 102. The casing string 110 may be made up of multiple casing joints 112 coupled together by a casing collar 114.

A fiber optic cable 116 may extend from the surface 104 downhole along a length of the wellbore 102. The fiber optic cable 116 may be positioned along an outer surface of the casing string 110. As depicted in FIG. 1, the fiber optic cable 116 may be wrapped around the casing string 110. The fiber optic cable 116 may be a fiber in metal tube ("FIMT") cable that includes multiple optical fibers positioned within a metal tube. The optical fibers may be coiled or have a length greater than the length of the metal tube of the fiber optic cable 116. Thus, a length of the casing string 110 may not be the same as a length of the fiber optic cable 116 or the optical fibers of the fiber optic cable 116. The fiber optic cable 116 includes sensors distributed along the length of the fiber optic cable 116.

The fiber optic cable 116 may be communicatively coupled to a sensing system, for example a Distributed Acoustic Sensing ("DAS") system 122 positioned at the surface 104. The DAS system 122 may also be communicatively coupled via a communication link 124 to a computing device 126. The computing device 126 may receive information and data from the DAS system 122 related to the data collected by the fiber optic cable 116 for calibrating the fiber optic cable 116.

The DAS system 122 may monitor and record backscatter noise in the fiber optic cable 116 as pulsed light is sent into the fiber optic cable 116. The optical fibers include sensors distributed along the length of the fiber optic cable 116. The DAS system 122 may send pulses of light into the fiber optic cable 116, via the optical fibers. The DAS system 122 may monitor the backscatter noise in the optical fibers as the pulsed light is sent into the fiber optic cable 116. Data corresponding to the backscatter noise may be transmitted from the DAS system 122 to the computing device 126. The computing device 126 may, either alone or in conjunction with manual process, process and transform the data received from the DAS system 122 for calibrating the fiber optic cable 116.

According to aspects of the present disclosure a tube wave may be excited downhole to calibrate the fiber optic cable 116. The fiber optic cable 116, in particular sensors along the length of the fiber optic cable 116, can sense the tube wave and reflections of the tube wave off obstacles within the wellbore 102. The fiber optic cable 116 can collect data associated with the tube wave and tube wave reflections and transmit it to the DAS system 122. Obstacles within the wellbore 102 may include any sources of impedance discontinuity that causes tube wave step-wise velocity change, for example but not limited to a change in an inner diameter of the casing string 110, a change in a thickness of the casing string 110, a clamp, centralizer, sleeve or other object coupled to the casing string 110. In some aspects, an obstacle may include a change in a density of a cement positioned within the annulus of the wellbore 102. The DAS system 122 may collect and record data from the fiber optic cable 116 related to the tube wave and reflections of the tube wave off the various obstacles in the wellbore 102.

A reflection of the tube wave off an obstacle may be detected by the fiber optic cable 116. The fiber optic cable 116 may also detect where the tube wave initially reflected off the obstacle. For example, a reflection of the tube wave off a casing collar 114 may be detected by the fiber optic cable 116. The fiber optic cable 116 may also detect where the reflected tube wave originated, in other words the location along the length of the fiber optic cable 116 that corresponds to the location of the casing collar 114. Thus, the particular reference point along the fiber optic cable 116 that corresponds to an origination of the reflected tube wave (i.e. the location where the tube wave reflected off the casing collar 114) may be detected by the fiber optic cable 116. Because the design of the casing string 110 is known, the depth of the casing collar 114 may be known and the reference point of the fiber optic cable 116 that corresponds to the reflection of the tube wave off the casing collar 114 may be calibrated as being the same as the location (e.g. depth) of the casing collar 114.

Once the reference point of the fiber optic cable 116 is matched to or calibrated with the location of the casing collar 114, the reference point may be referred to as a "calibrated reference point". Various features or obstacles associated with the casing string 110 or the wellbore 102 may also be known and each may be associated with a point along the fiber optic cable 116 where a reflection of the tube wave is detected. Thus, multiple points along the length of the fiber optic cable 116 between the ends of the fiber optic cable 116 may be associated with or matched to known obstacles of the casing string 110 that have known depths. Thus, the depth (or other location characteristic) of each of the multiple reference points along the fiber optic cable 116 may be determined by associating each reference point with an obstacle having a known depth. Those calibrated reference points may then be used by other downhole systems or applications, for example but not limited to fracking applications.

In some aspects, the computing device 126 may process and analyze the information and data received from the DAS system 122. For example, the computing device 126 may store information related to the design of the well system, including the design of the casing string and the location of downhole tools or equipment within the wellbore. The computing device 126 may associate data collected by the fiber optic cable 116, including data related to the origin location along the fiber optic cable 116 of a tube wave and/or a tube wave reflection, with the information related to the design of the well system. For example, the computing device 126 may associate a reference point along the fiber optic cable corresponding to the origination of a tube wave reflection with a particular obstacle within the wellbore. The computing device 126 may be, in some aspects, the computing device 600 depicted in FIG. 9.

Figure 2:
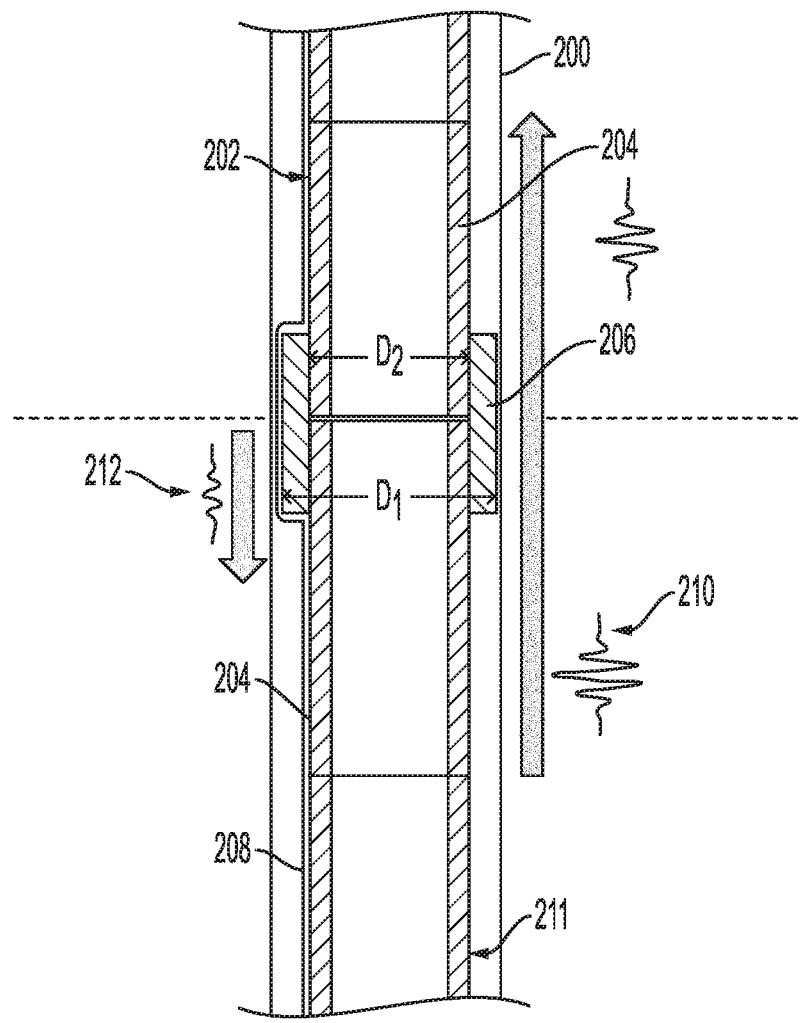
FIG. 2 is a cross-sectional side view of part of a well system in which a tube wave is excited for calibrating a fiber optic cable downhole, according to one aspect of the present disclosure.

FIG. 2 depicts a cross-sectional side view of a portion of a wellbore 200 in which a casing string 202 is positioned. The casing string 202 includes casing joints 204 coupled together via a casing collar 206. A diameter D1 of the casing string 202 at the casing collar 206 may be greater than a diameter D2 of the casing string 202 where there is no casing collar 206. The design of the casing string 202 positioned within the wellbore 200 may be known, thus the position (i.e. depth within the wellbore 200) of each casing joint 204 and the casing collar 206 may be known.

A fiber optic cable 208 may be positioned between an outer surface 211 of the casing string 202 and the wellbore 200. While FIG. 2, depicts the fiber optic cable 208 extending longitudinally along the length of the casing string 202, in some aspects, the fiber optic cable 208 may wrap around the casing string 202, for example as shown in FIG. 1.

To calibrate the fiber optic cable 208 positioned downhole within the wellbore 200, a tube wave 210 may be energized downhole. The tube wave 210 may meet an obstacle that results in a change in hydraulic impedance, and a portion of the tube wave 210 may be reflected back as a reflected tube wave 212. For example, the tube wave 210 may reflect off the casing collar 206 to form the reflected tube wave 212. The tube wave 210 is an interface wave whose propagation velocity is described as:

$$V = \left[\rho_m\left(\frac{1}{K_m} + \frac{1}{\mu + \frac{Eh}{2b}}\right)\right]^{-\frac{1}{2}}$$

where $\rho_m$ is fluid density, $K_m$ is the bulk modulus of the fluid, $\mu$ is the shear modulus of the rock, E is the Young modulus of the pipe, b is the outer diameter of the pipe, and h is the thickness of the casing string 202. In some aspects, the propagation velocity of the tube wave 210 can be determined from a DAS system, for example the DAS system 122 shown in FIG. 1.

Figure 3:
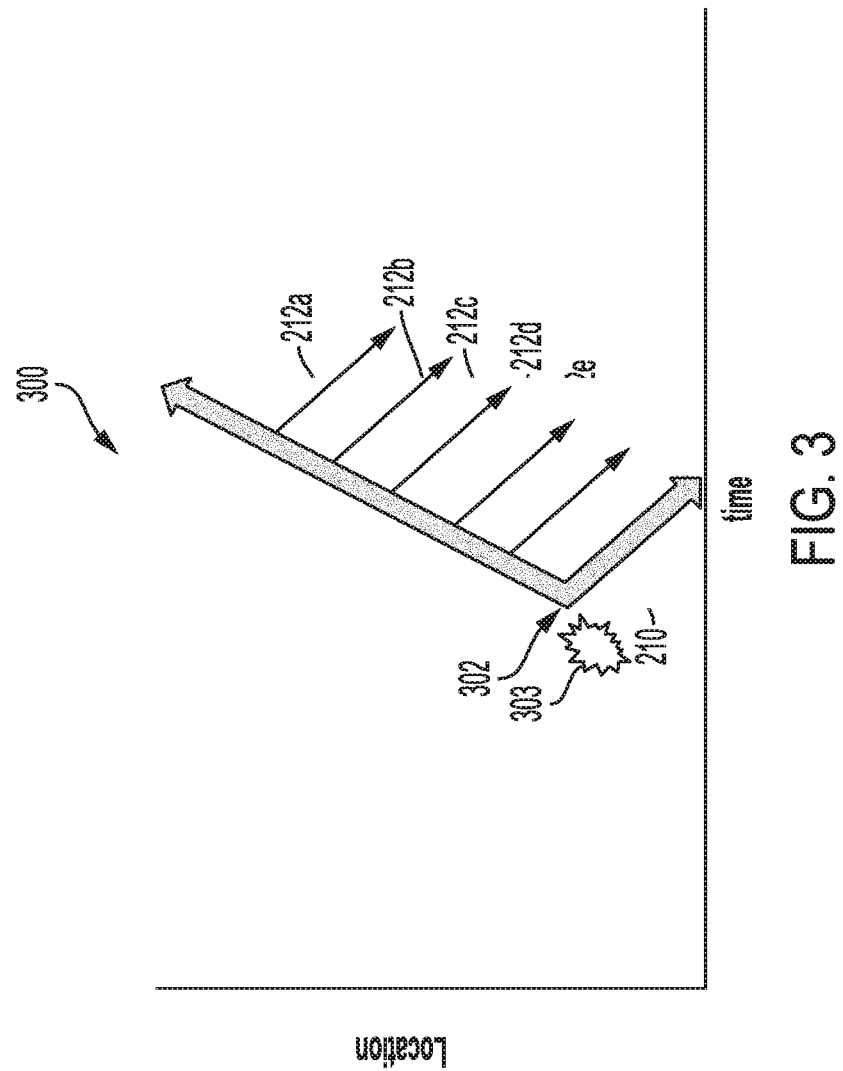
FIG. 3 is an exemplary Distributed Acoustic Sensing record, according to one aspect of the present disclosure.
Figure 4:
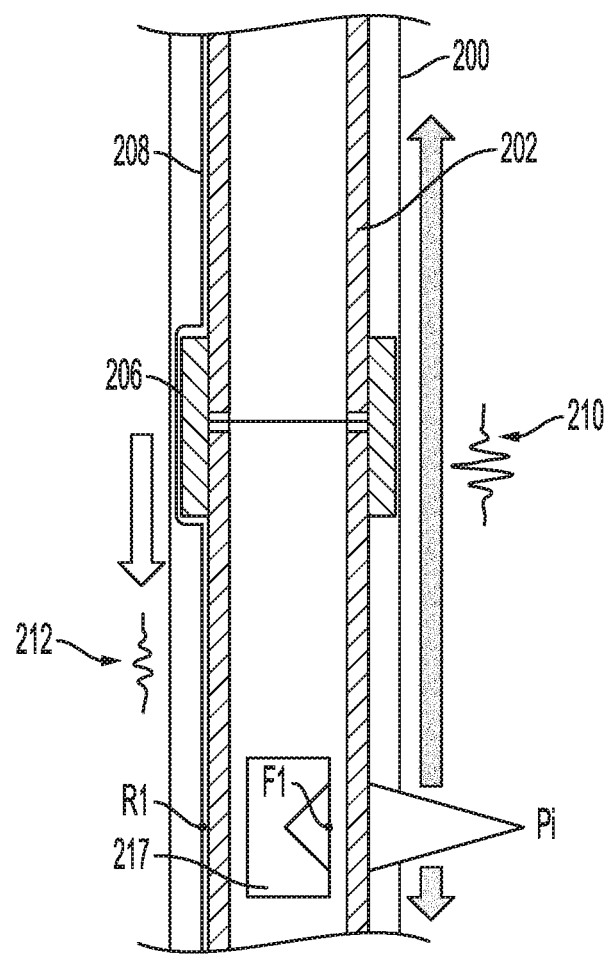
FIG. 4. is a cross-sectional side view of part of a well system in which a tube wave is excited for calibrating a fiber optic cable downhole, according to one aspect of the present disclosure.

The fiber optic cable 208 may detect the tube wave 210 and the reflected tube wave 212. The DAS system may monitor and record the backscatter noise of the fiber optic cable 208 corresponding to the tube wave 210 and the reflected tube wave 212, as shown for example in FIG. 3 depicting a DAS record 300 of the fiber optic cable 208. The DAS record 300 depicts time on the x-axis and a location along the fiber optic cable 208 on the y-axis. As shown in FIG. 3, the tube wave 210 has a v-shaped signature that includes an apex 302 that corresponds to the time and the location along the length of the fiber optic cable 208 of the event 303 that excited the tube wave 210. A range of acceptable propagation velocities (e.g., 1450 m/s-1600 m/s) or the actual propagation velocity may be set to determine the time and location of the event exciting the tube wave 210. In some aspects, the location of the event exciting the tube wave 210 may be used as a reference point along the length of the fiber optic cable 208 and may be associated with a known location along the casing string 202. For example, the event exciting the tube wave 210 may be a perforation of the casing string 202 at a known location, as shown in FIG. 4.

The fiber optic cable 208 including $N_r$ reference points along the length of the fiber optic cable 208 can be defined as a curve, r(p), along the wellbore trajectory and parameterized through a parameter, p=[0,1]; such that, r(p)=(x(p), y(p), z(p)); where $r(0)=r_1=(x_1, y_1, z_1)$ and is given or assumed to be a beginning of the fiber optic cable 208 and $r(1)=r_{N_r}=(x_{N_r}, y_{N_r}, z_{N_r})$ is given or assumed to be an opposite end of the fiber optic cable 2018, each location corresponding to a fiber optic cable reference point (e.g. a particular sensor location). Thus, $r_i$: for i=1 ... $N_r$ each correspond to discrete locations along the length of the fiber optic cable 208 which may correspond to discrete sensor locations.

As shown in the DAS record 300, the reflected tube waves 212a-e correspond to reflections of the tube wave 210 off various known obstacles within the wellbore 200. Each of the reflected tube waves 212a-e of the tube wave 210 detected along the length of fiber optic cable 208 can be matched or associated with the respective location of the known obstacles to calibrate the fiber optic cable 208. For example, the reflected tube wave 212a of the tube wave 210 can be associated with the tube wave 210 reflecting off the casing collar 206, based on knowledge about the design of the casing string 202 and the information reflected in the DAS record 300 (e.g., the amount of energy corresponding to the reflected tube wave 212a and location along the fiber optic cable where the energy was detected). The various hydraulic obstacles in the well can be automatically or manually associated with various tube wave reflections to calibrate the fiber optic cable 208 such that discrete locations along the length of the fiber optic cable 208 are associated with a specific location of a respective hydraulic obstacle.

Because the depth of the casing collar 206 is known, the location (e.g. reference point) along the fiber optic cable 208 that detected the origin of reflected tube wave 212a is also known. Thus, the location along the fiber optic cable 208 where the reflected tube wave 212a originated may be associated with the casing collar 206 and determined to have the same depth as the casing collar 206. Each of the reference points along the length of the fiber optic cable 208 where the various reflected tube waves 212a-e were sensed can similarly be associated with respective known obstacles of the casing string 202 and can each be determined to be at the same depth as the respective known obstacles. Thus, the fiber optic cable 208 can be calibrated by associating multiple reference points along the fiber optic cable 208 with known obstacles in the casing string 202. For example, reflected tube waves 212a-e may each correspond to respective casing collars, casing diameter changes, a fluid top level, downhole equipment located within the casing string 202, or a combination of those features.

Figure 10:
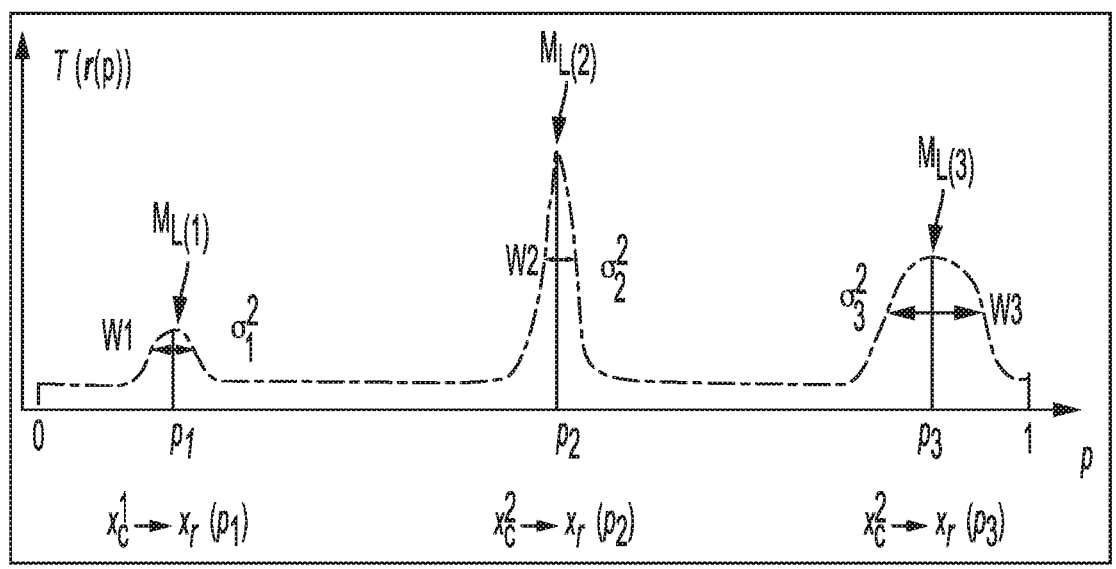
FIG. 10 is an exemplary image of multiple reflected tube waves sensed by a fiber optic cable, according to some aspects of the present disclosure.

An image depicting the reflected tube waves (e.g. one or more of reflected tube waves 212a-e) sensed by the fiber optic cable 208 along a length of the fiber optic cable 208 may be created, for example as shown in FIG. 10. The image T(r) shown in FIG. 10 corresponds to a maximum likelihood function of a possible reflector, creating the reflected tube waves sensed by the fiber optic cable 208 at various locations along the length of the fiber optic cable 208 and may be created using the following technique based the reflection of an original tube wave off one or more obstacles (i.e. the reflected tube waves associated with an original tube wave) where the source location of the original tube wave is either known or estimated:

$$T(r_k) = \sum_{l=t_o}^{t_o+\Delta t} \sum_{i=1}^{N_r} b(s, r_k, r_i)\tilde{R}(r_i, t_i + \tau(s, r_k) + \tau(r_k, r_l))$$

where $\tilde{R}(r, t)$ is DAS data containing only reflection data (i.e., direct arrival and all other arrivals removed from original data—R(r, t)); τ(x, y) are travel-times calculated from previously estimated velocities V(r) from a location x to a location y along the length of the wellbore (for example, if velocity is homogeneous and isotropic V(r)=V; then $$\tau(x, y) = \frac{\text{distance}(x, y)}{V};$$

Δt is a wavelet length; and b(x,s,r) is an amplitude change from source location s of a tube wave (e.g. tube wave 210) to location x and back to receiver r. This solution can be extended to several sources of original tube waves, each resulting in a plurality of reflected tube waves, characterized by $s_j$ and $t_o^j$ where j=1 ... $N_s$ number of sources of original tube waves.

$$T(r_k) = \sum_{j=1}^{N_S} \sum_{l=t_o^j}^{t_o^j+\Delta t} \sum_{i=1}^{N_r} b(s_j, r_k, r_i)\tilde{R}(r_i, t_l^j + \tau(s_j, r_k) + \tau(r_k, r_i))$$

FIG. 10 also depicts a local maximum $M_{L(N)}$ of the each created reflected tube wave image T(r), specifically local maxima $M_{L(1)}$, $M_{L(2)}$, $M_{L(3)}$. The computed image T(r) presents the maximum likelihood function of a possible reflector location. Therefore, the local maximum $M_{L(N)}$ of an image of a reflected tube wave may correspond to the most probable origination location of the reflected tube wave along the fiber optic cable. The most probable origination location can be selected as a reference point on the fiber optic cable that may be associated with (or matched to) a location of an obstacle within the wellbore.

Figure 11:
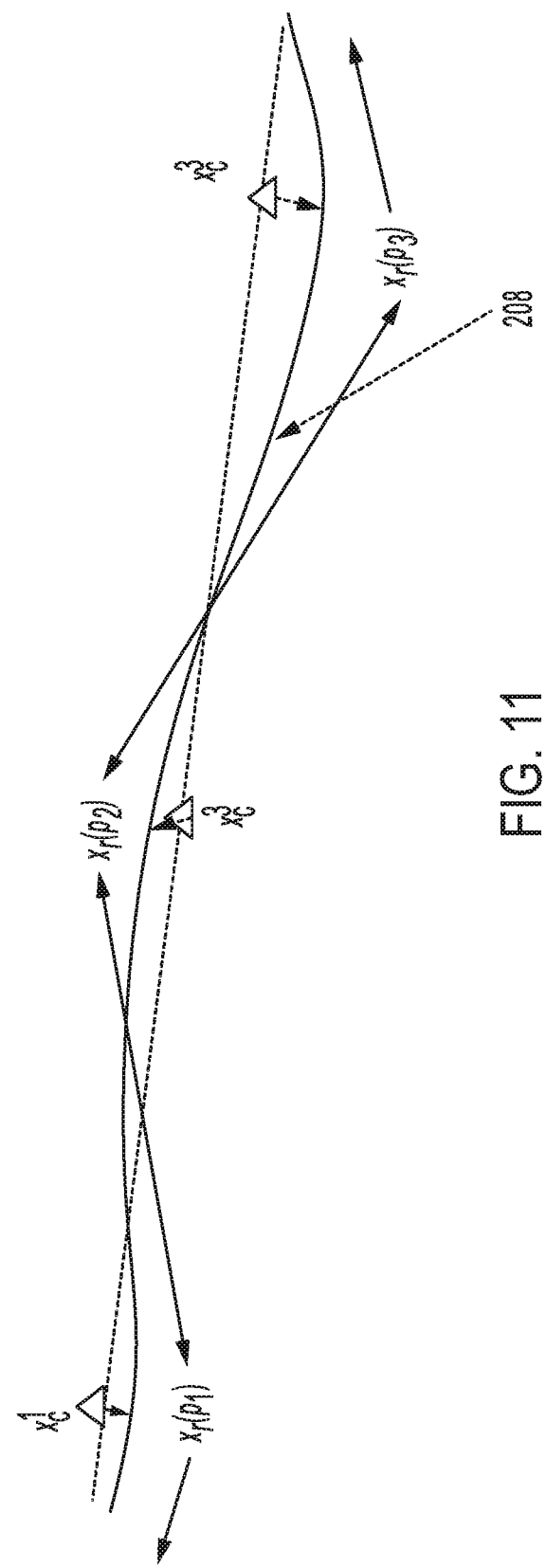
FIG. 11 is an exemplary image depicting the calibration, interpolation, and extrapolation of various reference points along a fiber optic cable, according to some aspects of the present disclosure.

The known location of well joints or other obstacles' locations in the wellbore can be associated with (match to) the reference points detected along the length of the fiber optic cable corresponding to an originating location of a reflected tube wave. FIG. 11 depicts an exemplary image of the fiber optic cable 208 of FIG. 10 where a plurality of known locations $x_c^1$, $x_c^2$, $x_c^3$ of various obstacles positioned along the length of the wellbore are associated with (or matched to) to the local maxima ($M_{L(1)}$, $M_{L(2)}$, $M_{L(3)}$) at $x_{r(p_1)}$, $x_{r(p_2)}$, $x_{r(p_3)}$ of the reflected tube wave images corresponding to three respective reference points along the length of the fiber optic cable. The respective reference points that are associated with (or matched to) respective obstacles in the wellbore may be referred to as "calibrated reference points."

In addition, a spatial uncertainty (e.g. an uncertainty magnitude) associated with each of the calibrated reference points along the length of the fiber optic cable (e.g. fiber optic cable 208) can be determined. In some aspects, the spatial uncertainty may be determined from an image depicting the reflected tube waves detected by a fiber optic cable, for example an image as depicted in FIG. 10. The uncertainty magnitude of the calibrated reference point can correspond to the width (e.g. $W_1$, $W_2$, $W_3$) of the local maximum $M_{L(N)}$ of the image of the reflected tube wave. The shape of local maximum can be associated with the uncertainty magnitude. For example, a wide local maximum can correspond to a large uncertainty magnitude while a narrow local maximum can correspond to a small uncertainty magnitude. The uncertainty magnitude associated with a calibrated reference point along the fiber optic cable may be estimated as a variance ($\sigma^2$) of the certain distribution matched with the T(r) along the fiber optic cable direction $\hat{d}$. Therefore, the variance ($\sigma^2$) can be a measure of the uncertainty magnitude.

A certain distribution of sensors along the length of the fiber optic cable may be assumed, wherein each sensor corresponds to a location along the length of the fiber optic cable. In some aspects, a uniform distribution may be assumed. In other asepcts, non uniform distribution may be assumed. Based at least in part on the distribution of sensors along the length of the fiber optic cable (assumed or known) additional locations along the length of the fiber optic cable may be interpolated or extrapolated. For example, while some locations along the length of the fiber optic cable may be calibrated reference points (e.g. reference points determined by detecting original and/or reflected tube waves and associating them with a known obstacle) additional locations along the length of the fiber optic cable may be estimated by interpolation or extrapolation based at least in part on the calibrated reference points and the uncertainty values described above.

Applying the interpolation or extrapolation, each sensor along the length of the fiber optic cable (each corresponding to a location along the length of the fiber optic cable) may be assigned a most probable location $x_r$ with uncertainty magnitude $\sigma_r^2$ and directional vector $\hat{d}_r$. Therefore, all reference points (sensor locations) are now calibrated: Each point has an associated location, uncertainty magnitude and a directional vector. These parameters can be used to improve the results of any application relying upon data from the calibrated fiber optic cable. For example, the calibrated locations determined by matching original and/or reflected tube waves to known obstacles as well as the additional location determined by interpolation and/or extrapolation may be relied upon in additional wellbore systems (or applications). Those calibrated locations along the length of the fiber optic cable when used in an additional system (or application) may be weighted based at least in part on the uncertainty values described above. By weighting the calibrated locations based at least in part on the uncertainty magnitude associated with each location, the additional wellbore systems (or applications) may be improved. For example, in case of locating microseismic events, the weight of a particular calibrated location along the length of the fiber optic cable may be estimated by: $w(x, x_r) = |\cos(\alpha_r)\sigma_r^2|$. Calibration can be performed in an iterative manner, where after initial calibration, reflections are reimaged and calibration is done again. Additionally imaging and calibration can be done on direct arrivals of the calibration source or any other seismic events that can be used to create seismic image in maximum likelihood fashion.

Figure 12:
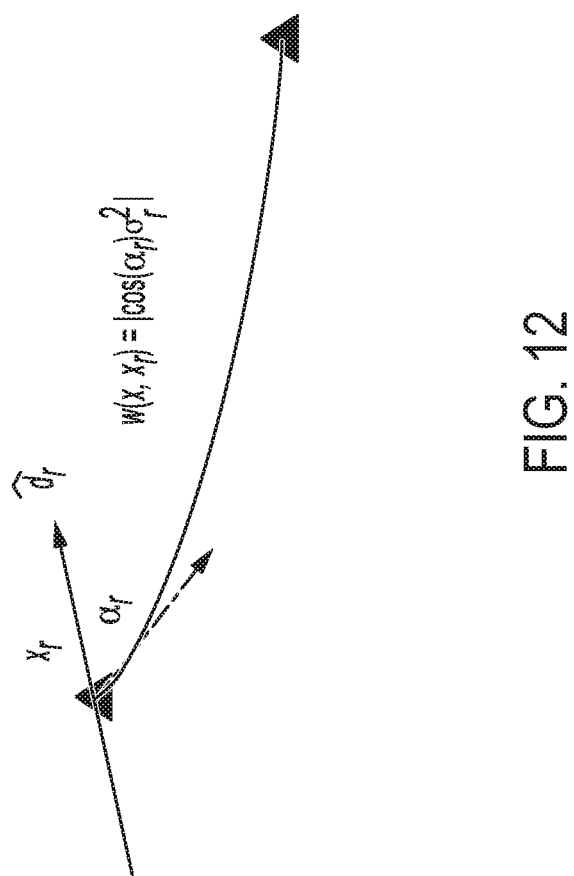
FIG. 12 is an exemplary image depicting a reference point along the fiber optic cable and an estimated weight where the reference point was determined in accordance with aspects of the present disclosure.

FIG. 12 depicts a calibrated reference point (or calibrated location) $x_r$ and the estimated weight $w(x, x_r)$ for a potential microseismic event location x where the weight is based in part on the uncertainty magnitude $\sigma_r^2$ of that calibrated location and in part on the cosine of an angle, $\alpha_r$, between the directional vector of the fiber cable, $\hat{d}_r$, and seismic ray direction from calibrated location $x_r$ to potential microseismic event location, x. Where the calibrated location $x_r$ has a low uncertainty magnitude then the weight will maximize that location value in a wellbore application (e.g. a wellbore fracking system). Where calibrated location $x_r$ has a greater uncertainty magnitude then the weight will minimize that location value in a wellbore application. In other words, when using the calibrated locations along the length of the fiber optic cable in a system or application (e.g., microseismic monitoring, temperature monitoring, pressure monitoring, fracking applications, etc.) calibrated locations having a lower uncertainty magnitude can be weighted more calibrated locations that greater uncertainty magnitudes. Similarly, calibrated locations having greater uncertainty magnitudes can be weighted less than calibrated locations that have lower uncertainty magnitudes. By giving more weight to calibrated locations that are determined to be more accurate and giving less weight to calibrated locations that are determined to be less accurate, the systems and applications relying upon the data associated with the calibrated locations along the fiber optic cable (including both calibrated locations and interpolated/extrapolated locations) can be further improved.

For example, in an exemplary wellbore system, the wellbore system may perform microseismic imaging with DAS. If the measured data on DAS is a strain, $\varepsilon_{\hat{d}\hat{d}}(x_r, t)$, the following imaging technique or one of its modification may be used to image the microseismic data:

$$f_{ps}(x, t) = \frac{1}{\|a_{ps}(\hat{m}, \widehat{d_r}, x, x_r)\|} \sum_{N_r} a_{ps}(\hat{m}, \widehat{d_r}, x, x_r) \varepsilon_{\hat{d}\hat{d}}(x_r, t + \tau_{ps}(x, x_r))$$

where $a_{ps}(\hat{m}, \widehat{d_r}, x, x_r)$ are modeling elongations of the strain from geometrical optics theory (e.g., Kirchoff, beamforming or diffraction stacking) for given values of $\hat{m}$, $\widehat{d_r}$, x, and $x_r$ of P waves, S waves, or a combination of P and S waves of microseismic activity. Further, $a_{ps}$ represents a predicted amplitude based on the model from the geometrical optics theory, $\hat{m}$ represents known information concerning the moment tensor and the focal mechanism, $\widehat{d_r}$ represents a direction of the fiber optic cable, and $\tau_{ps}$ is travel time, determined from given seismic velocities of P and S waves, from a subsurface location x to a location $x_r$ of a section of the fiber optic cable where the strain is measured.

The microseismic imaging above can be improved by the following weighted imaging which makes use of the weighted values of the various calibrated locations (including calibrated reference points and interpolated and/or extrapolated reference points) along the length of the fiber optic cable, in accordance with the methods described herein:

$$f_{ps}(x, t) = \frac{1}{\|a_{ps}(\hat{m}, \widehat{d_r}, x, x_r)\|} \sum_{N_r} \frac{a_{ps}(\hat{m}, \widehat{d_r}, x, x_r)}{w_r(x, x_r)} \varepsilon_{\hat{d}\hat{d}}(x_r, t + \tau_{ps}(x, x_r))$$

where $w_r(x, x_r) = |\cos(\alpha_r)\sigma_r^2|$ with $\alpha_r$ angle between $\widehat{d_r}$ and ray traveling from x to $x_r$.

The calibration of a fiber optic cable, for example fiber optic cable 208 in accordance with the methods described herein may be performed by eliciting tube waves (e.g. tube wave 210) in a variety of manners. For example, FIG. 4 depicts an aspect of the present disclosure in which the tube wave 210 is excited within the wellbore 200 by perforating the casing string 202. For example, the casing string 202 may be perforated using a perforation gun 217. In some aspects, the location P1 along the casing string 202 where the casing string 202 is perforated may be known and used to calibrate the fiber optic cable 208. For example, the location F1 along the casing string 202 where the perforation gun 217 is located may be associated with a location R1 along the fiber optic cable 208 that reflects the origination of the tube wave 210 (e.g. via information collected by the DAS system). In addition, the tube wave 210 may reflect off the casing collar 206 and that reflection may be detected by the fiber optic cable 208. The reference point on the fiber optic cable 208 corresponding to the reflection of the tube wave 210 (forming the reflected tube wave 212) can thereby be associated with the casing collar 206 and that reference point can be calibrated as having the same depth as the casing collar 206. Additional reference points along the length of the fiber optic cable 208 may be calibrated with additional obstacles along the length of the wellbore 200 for calibrating the length of the fiber optic cable 208.

Figure 5:
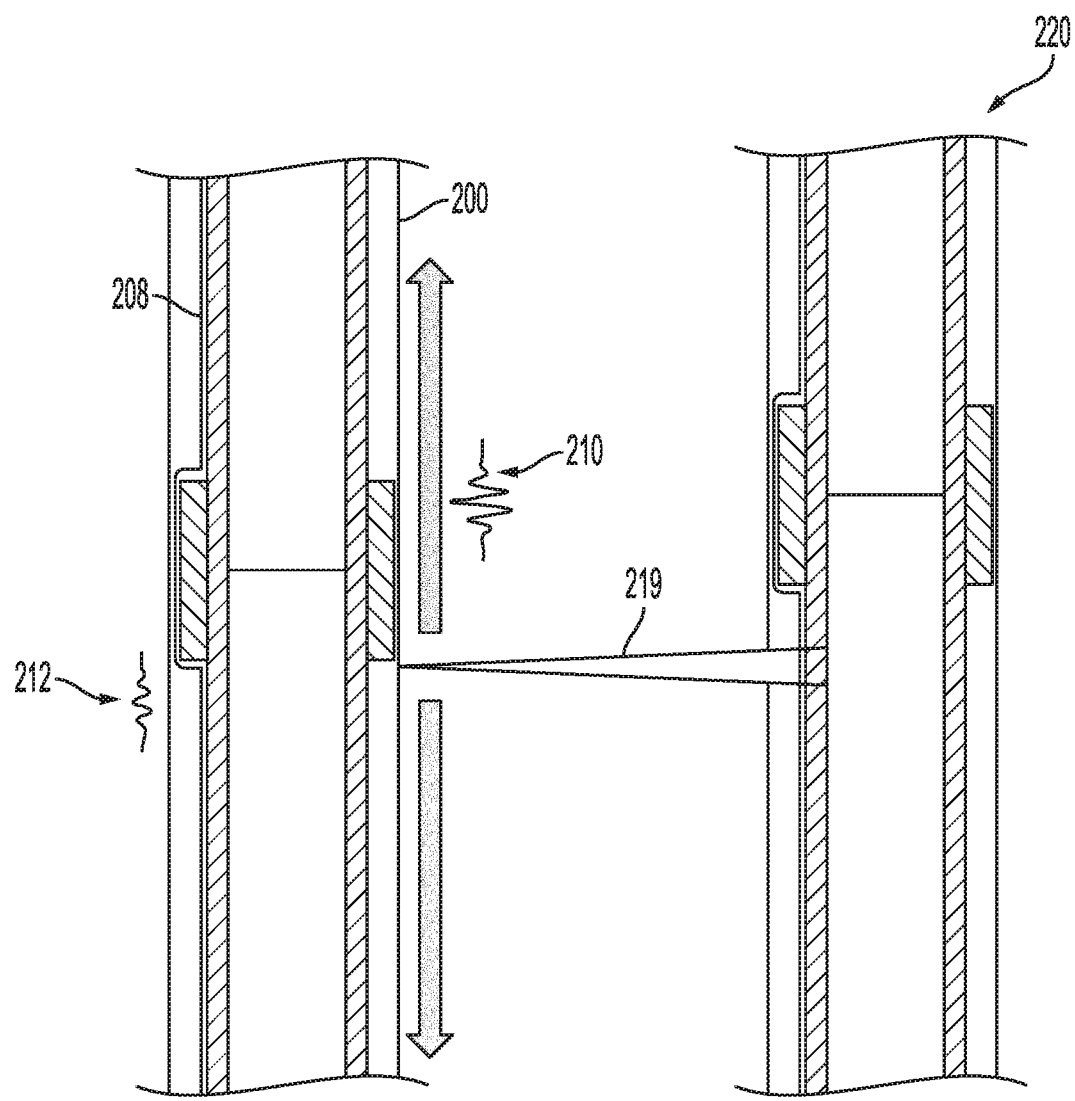
FIG. 5 is a cross-sectional side view of part of a well system in which a tube wave is excited by a frac hit from an adjacent well system for calibrating a fiber optic cable downhole, according to one aspect of the present disclosure.

FIG. 5 depicts an aspect of the present disclosure in which the tube wave 210 is excited within the wellbore 200 by inducing a frac hit 219 from a second well 220 undergoing hydraulic fracturing in proximity to the wellbore 200. The frac hit 219 corresponds to a charge of pressure in the wellbore 200 from the second well 220. The frac hit 219 can induce the tube wave 210 which may reflect off obstacles in the wellbore 200 creating reflected tube waves 212 for calibrating the fiber optic cable 208. The known locations of obstacles within the wellbore 200 can be matched to the reflections of the tube wave 210 (i.e. the origination of the reflected tube waves 212) off the various obstacles for calibrating the length of fiber optic cable 208 positioned within the wellbore 200.

Figure 6:
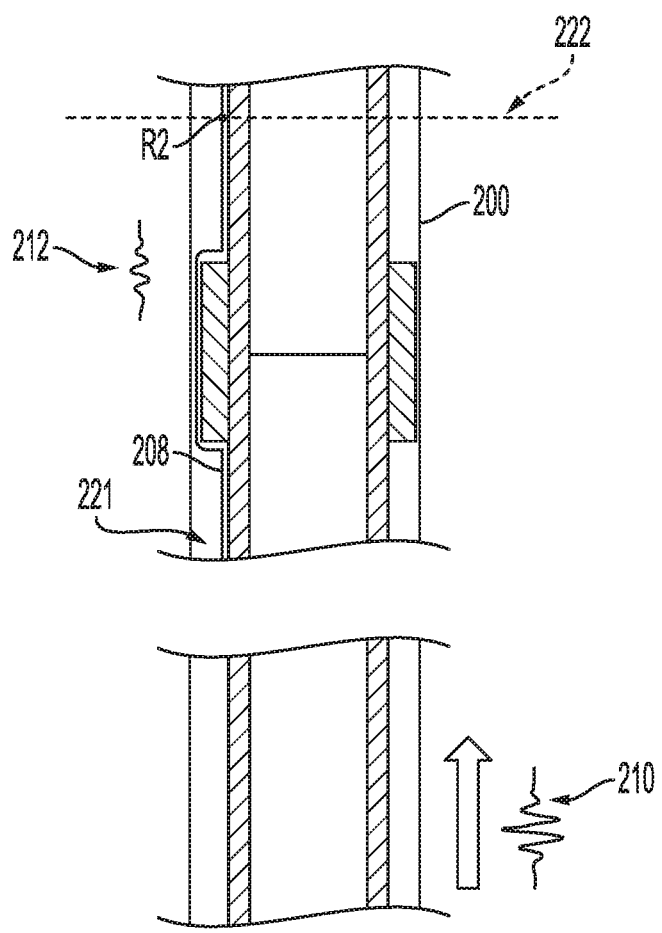
FIG. 6 is a cross-sectional side view of part of a well system in which a tube wave is excited for calibrating a fiber optic cable downhole, according to one aspect of the present disclosure.

FIG. 6 depicts an aspect of the present disclosure in which the tube wave 210 is excited within the wellbore 200 and reflects off the fluid top level 222 forming a reflected tube wave 212. In some aspects, as shown in FIG. 6, the exciting event may occur below an end 221 of the fiber optic cable 208. The fluid top level 222 can induce a strong hydraulic impedance in the tube wave 210 and can act as a reference point for calibrating the fiber optic cable 208. The depth of the fluid top level 222 is known and can be associated with a reference point R2 along the fiber optic cable 208 via the DAS system record by the strong hydraulic impedance associated with the tube wave 210 interacting with the fluid top level 222. Thus, the depth at the reference point R2 on the fiber optic cable 208 can be determined to be the depth of the fluid top level 222.

Figure 7:
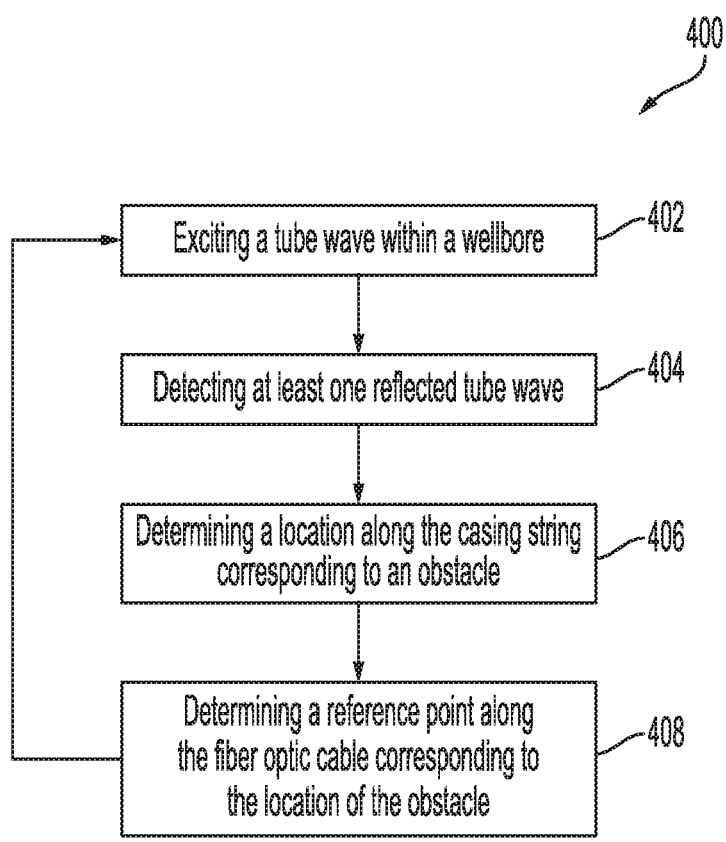
FIG. 7 is a flow diagram of a method of calibrating a fiber optic cable downhole, according to one aspect of the present disclosure.

FIG. 7 depicts a flowchart of an exemplary process 400 for calibrating a fiber optic cable positioned downhole in a wellbore according to some aspects of the present disclosure. At step 402, the process 400 may include exciting a tube wave within the wellbore, for example but not limited to by perforating the casing string or inducing a frac hit in the wellbore. At a step 404, the process 400 may include detecting, by the fiber optic cable, at least one reflected tube wave. Each of the at least one reflected tube waves correspond to a reflection of the tube wave off an obstacle. Each obstacle may be a known obstacle within the wellbore, including, but not limited to, a diameter change in the casing string (e.g. a casing collar), a fluid top level, or a downhole tool/equipment. At a step 406, the process 400 may include determining a location along the casing string corresponding to each of the obstacles. At step 408, the process 400 may include determining a reference point along the fiber optic cable corresponding to the location of each obstacle for calibrating the fiber optic cable. After step 408, the process 400 may return to step 402 and another tube wave may be excited within the wellbore. In some aspects, the tube wave may be excited from the same or a different location along the wellbore. For example, in aspects in which multiple tube waves are excited repeatedly at the same location, the signal associated with the reflected tube wave off an obstacle can be enhanced for improving detection by the fiber optic cable. In some aspects, a controlled seismic source can excite multiple tube waves at the same location.

Figure 13:
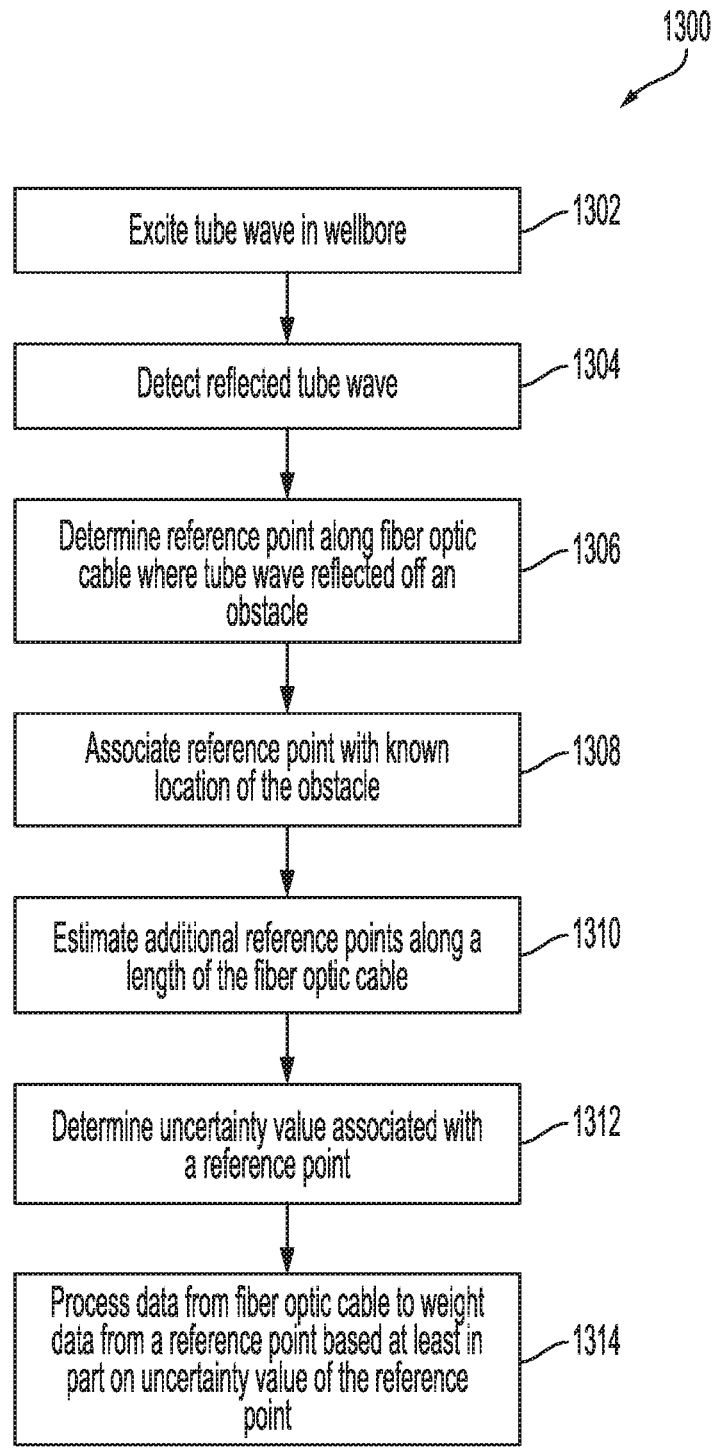
FIG. 13 depicts an exemplary process for calibrating a fiber optic cable and optimizing a downhole application utilizing data from the calibrated fiber optic cable, according to one aspect of the present disclosure.

FIG. 13 depicts an exemplary process 1300 for calibrating a fiber optic cable and optimizing a downhole application that utilizes data from the fiber optic cable. At step 1302, the process 1300 may include exciting a tube wave within a wellbore, for example but not limited to by perforating the casing string or inducing a frac hit in the wellbore. At a step 1304, the process 1300 may include detecting, by the fiber optic cable, at least one reflected tube wave. Each of the at least one reflected tube waves correspond to a reflection of the tube wave off an obstacle. Each obstacle may be a known obstacle within the wellbore, including, but not limited to, a diameter change in the casing string (e.g. a casing collar), a fluid top level, or a downhole tool/equipment. At a step 1306, the process 1300 may include determining a reference point (or location) along the fiber optic cable where the tube wave reflected off an obstacle. At step 1308, the process 1300 may include associating the reference point on the fiber optic cable with a known location of the obstacle the tube wave reflected off of to form the reflected tube wave. At step 1310, the process 1300 may include estimating additional reference points along a length of the fiber optic cable, as discussed above. At step 1312, the process 1312 may include determining an uncertainty value (for example an uncertainty magnitude) of the reference point determined in step 1306. At step 1314, the process 1300 may include processing data from the fiber optic cable for use in a downhole application. Processing the data includes weighting the data from the reference point based at least in part on the uncertainty value of the reference point. to the location of each obstacle for calibrating the fiber optic cable. Though the process 1300 references the process with respect to a single reference point, this process may be repeated or performed with respect to multiple reference points along the length of the fiber optic cable.

Figure 8:
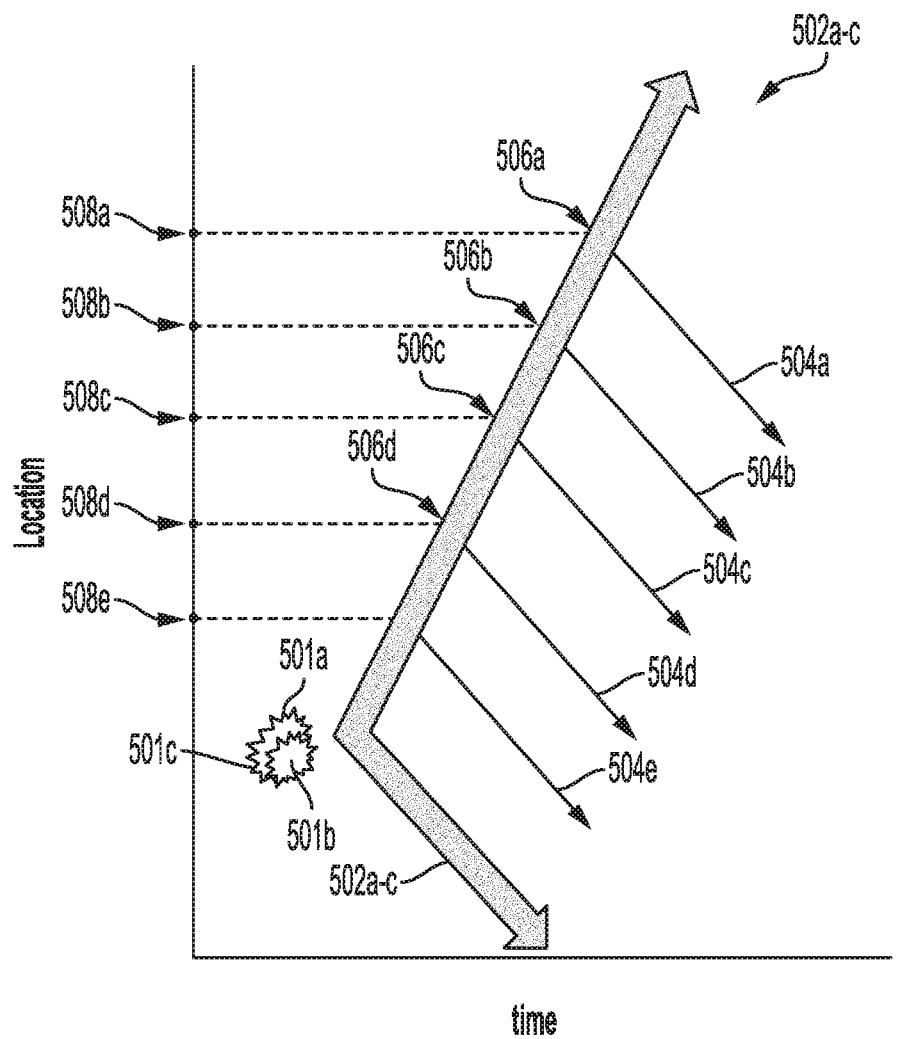
FIG. 8 is an exemplary Distributed Acoustic Sensing record, according to one aspect of the present disclosure.

FIG. 8 depicts an exemplary DAS record 500, which depicts multiple exciting events 501*a-c* for exciting multiple tube waves 502*a-c* (overlapping as shown in FIG. 8) being excited at approximately the same location in the wellbore. In some aspects, the exciting events 501*a-c* may occur at different locations in the wellbore. In aspects in which the exciting events 501*a-c* occur at approximately the same location, the location may be known (e.g. perforating the casing string at a known location, exciting a controlled seismic source, etc.) and can be associated with a location along the fiber optic cable which detects the origination of the tube waves 502*a-c*. In some aspects, a single one of the exciting events 501*a-c* may not provide sufficient strong reflected tube waves for providing additional reference points along the fiber optic cable for calibrating the fiber optic cable. In some aspects, by stacking multiple exciting events together, for example, at the same location within the wellbore, the signal of the reflected tube waves 504*a-e* may be enhanced such that the reflected tube waves 504*a-e* are detectable. Each of the reflected tube waves 504*a-e* can be determined to correspond to the reflection of the tube waves 502*a-c* off a known obstacle 506*a-e* within the wellbore, for example, a particular casing joint, downhole tool, or other known obstacle. Thus, the location of the known obstacles 506*a-e* within the wellbore can correspond to the location 508*a-e* along the fiber optic cable shown depicted on the y-axis. In some aspects, multiple tube waves may originate at different locations for enhancing reflected tube waves for calibrating the fiber optic cable downhole.

Figure 9:
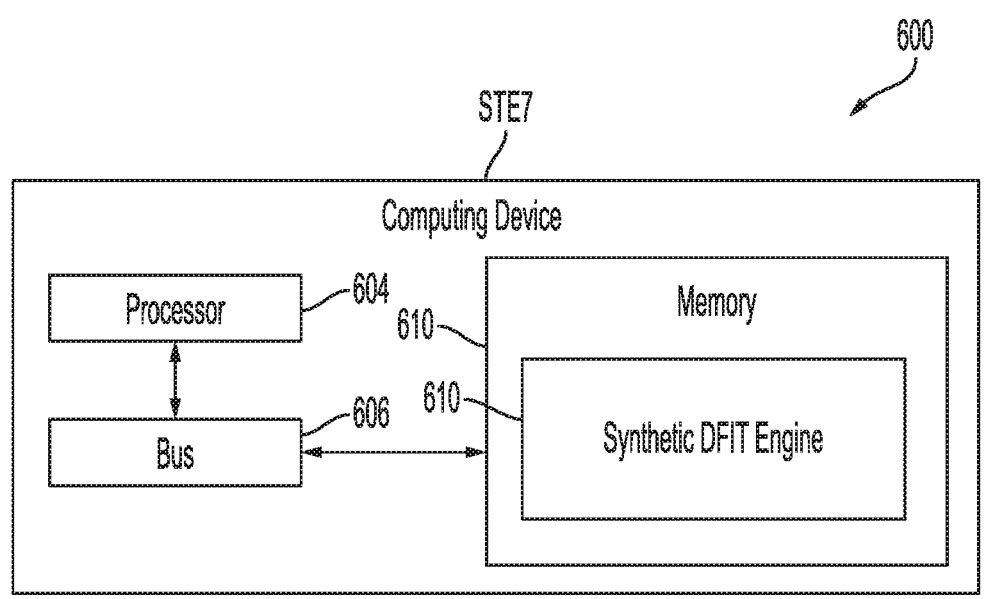
FIG. 9 is a block diagram of a system that can be used as part of a system for calibrating a fiber optic cable downhole, according to some aspects of the present disclosure.

FIG. 9 is a block diagram of a computing device 600 that can be used for calibrating a fiber optic cable according to some aspects of the present disclosure. The computing device 600 can include a processor 604, a memory 607, and a bus 606. In some aspects, the processor 604 can execute one or more operations of computer program code instructions for calibrating a fiber optic cable, e.g., by receiving data from a DAS system and associating or correlating reference points along a fiber optic cable with obstacle or features of a wellbore. The processor 604 can execute instructions stored in the memory 607 to perform the operations. The processor 604 can include one processing device or multiple processing devices. Non-limiting examples of the processor 604 include a Field-Programmable Gate Array ("FPGA"), an application-specific integrated circuit ("ASIC"), a microprocessor, etc.

The processor 604 can be communicatively coupled to the memory 607 via the internal bus 606. The non-volatile memory 607 may include any type of memory device that retains stored information when powered off. Non-limiting examples of the memory 607 include electrically erasable and programmable read-only memory ("EEPROM"), flash memory, or any other type of non-volatile memory. In some examples, at least part of the memory 607 can include a medium from which the processor 604 can read instructions. A computer-readable medium can include electronic, optical, magnetic, or other storage devices capable of providing the processor 604 with computer-readable instructions or other program code. Non-limiting examples of a computer-readable medium include, but are not limited to, magnetic disk(s), memory chip(s), ROM, random-access memory ("RAM"), an ASIC, a configured processor, optical storage, or any other medium from which a computer processor can read instructions. The instructions can include processor-specific instructions generated by a compiler, or an interpreter, from code written in any suitable computer-programming language, including, for example, C, C++, C#, etc.

As used below, any reference to a series of examples is to be understood as a reference to each of those examples disjunctively (e.g., "Examples 1-4" is to be understood as "Examples 1, 2, 3, or 4").

Example 1 is a method for optimizing a downhole application, comprising: calibrating a fiber optic cable positioned downhole within a wellbore for defining a calibrated fiber optic cable, further comprising: exciting a tube wave in the wellbore; detecting, by the fiber optic cable a first reflected tube wave; determining a first reference point along the fiber optic cable that corresponds to a location along the fiber optic cable where the tube wave reflected off an obstacle to form the first reflected tube wave; associating the first reference point along the fiber optic cable with a location of the obstacle; determining an uncertainty magnitude of the first reference point; and applying a weight to data collected by the fiber optic cable at the first reference point during interpretation of the data in the downhole application, wherein the weight applied to the data collected by the fiber optic cable at the first reference point is based at least in part on the uncertainty magnitude of the first reference point.

Example 2 is the method of example 1, the step of calibrating the fiber optic cable further comprising further comprising: determining, via a computing device, the location of the obstacle based at least in part on a known design of a casing string within the wellbore.

Example 3 is the method of example(s) 1-2, further comprising: creating an image of the first reflected tube wave based at least in part on data received by the fiber optic cable; and determining a local maximum of the image of the first reflected tube wave, wherein the local maximum corresponds to the first reference point along the fiber optic cable.

Example 4 is the method of example 3, further comprising: determining a variance associated to the local maximum of the image of the first reflected tube wave, wherein the uncertainty magnitude is based at least in part on the variance associated to the local maximum of the image of the first reflected tube wave.

Example 5 is the method of examples 1-4, the step of calibrating the fiber optic cable further comprising: interpolation or extrapolation of additional reference points along a length of the fiber optic cable based at least in part on the uncertainty magnitude of the first reference point for calibrating the fiber optic cable along the length of the fiber optic cable.

Example 6 is the method of examples 1-5, wherein the obstacle is at least one of a casing joint, a change in diameter of a casing string, or a top level of fluid within the casing string.

Example 7 is the method of examples 1-6, wherein the weight applied to the data collected by the fiber optic cable at the first reference point increases as the uncertainty magnitude of the first reference point decreases.

Example 8 is the method of example 2, the step of calibrating the fiber optic cable further comprising: associating an initial reference point along the fiber optic cable with a known location of a perforation made for exciting the tube wave.

Example 9 is the method of examples 1-8, the step of calibrating the fiber optic cable further comprising: detecting, by the fiber optic cable a second reflected tube wave corresponding to a second reflection of the tube wave off a second obstacle; determining, a second reference point along the fiber optic cable that corresponds to a location along the fiber optic cable where the tube wave reflected off the second obstacle to form the second reflected tube wave; and associating the second reference point along the fiber optic cable with a location of the second obstacle.

Example 10 is the method of example 9, further comprising: determining a second uncertainty magnitude of the second reference point; and applying a second weight to data collected by the fiber optic cable at the second reference point during interpretation of the data in the downhole application, wherein the second weight applied to the data collected by the fiber optic cable at the second reference point is based at least in part on the second uncertainty magnitude.

Example 11 is the method of example 10, the step of calibrating the fiber optic cable further comprising: detecting, by the fiber optic cable at a third reference point along the fiber optic cable, a third reflected tube wave corresponding to a reflection of the tube wave off a third obstacle; determining a location along a casing string corresponding to the third obstacle; and associating the third reference point along the fiber optic cable with the location of the third obstacle for calibrating the fiber optic cable.

Example 12 is the method of example 11, the step of calibrating the fiber optic cable further comprising: detecting, by the fiber optic cable a third reflected tube wave corresponding to a third reflection of the tube wave off a third obstacle; determining, a third reference point along the fiber optic cable that corresponds to a location along the fiber optic cable where the tube wave reflected off the third obstacle to form the third reflected tube wave; and associating the third reference point along the fiber optic cable with a location of the third obstacle.

Example 13 is the method of examples 1-12, the step of calibrating the fiber optic cable further comprising: exciting a second tube wave in the wellbore; detecting, by the fiber optic cable a second reflected tube wave corresponding to a reflection of the second tube wave off a second obstacle; determining, a second reference point along the fiber optic cable that corresponds to a location along the fiber optic cable where the second tube wave reflected off the second obstacle to form the second reflected tube wave; and associating the second reference point along the fiber optic cable with a location of the second obstacle.

Example 14 is the method of example 13, wherein the tube wave and the second tube wave originate from the same location in the wellbore.

Example 15 is the method of example 14, wherein the obstacle and the second obstacle are the same obstacle.

Example 16 is a method of forming a calibrated fiber optic cable and processing data from the calibrated fiber optic cable for use in a wellbore system: calibrating a fiber optic cable, further comprising: detecting a first reflected tube wave along a length of the fiber optic cable; determining a first reference point along the fiber optic cable corresponding to a location where a tube wave reflected off an obstacle to produce the first reflected tube wave; associating the first reference point along the fiber optic cable with a known location of the obstacle within for defining a first calibrated reference point; detecting a second reflected tube wave along the length of the fiber optic cable; determining a second reference point along the fiber optic cable corresponding to a location where a second tube wave reflected off a second obstacle to produce the second reflected tube wave; associating the second reference point along the fiber optic cable with a known location of the second obstacle for defining a second calibrated reference point; estimating additional reference points along the length of the fiber optic cable between the first reference point and the second reference point; processing, by a computing device, data from the calibrated fiber optic cable by applying a weight to the data received from the calibrated fiber optic cable, wherein the weight corresponds to an uncertainty value associated with a particular location along the length of the calibrated fiber optic cable.

Example 17 is the method of example 16, further comprising: computing an image of the first reflected tube wave; computing an image of the second reflected tube wave; wherein the first reference point along the fiber optic cable corresponds to a first local maximum of the image of the first reflected tube wave, and wherein the second reference point along the fiber optic cable corresponds to a second local maximum of the image of the second reflected tube wave.

Example 18 is the method of example 17, further comprising: determining an uncertainty value of the first reference point, wherein the uncertainty value corresponds to a variance associated with the first local maximum of the image of the first reflected tube wave; and determining an uncertainty value of the second reference point, wherein an uncertainty value corresponds to a variance associated with the second local maximum of the image of the second reflected tube wave.

Example 19 is the method of example 18, the step of estimating additional locations along the length of the fiber optic cable between the first reference point and the second reference point further comprising: extrapolating or interpolating estimates for the additional locations along the length of the fiber optic cable based at least in part on the first reference point and the second reference point.

Example 20 is the method of example 19, where computing the image of the first reflected tube wave, computing the image of the second reflected tube wave, and estimating additional location along the length of the fiber optic cable is performed in an iterative manner.

The foregoing description of the aspects, including illustrated aspects, of the disclosure has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:

1. A method for optimizing a downhole application, comprising:
    calibrating a fiber optic cable positioned downhole within a wellbore for defining a calibrated fiber optic cable, further comprising:
        monitoring a first tube wave in the wellbore;
        detecting, by the fiber optic cable a first reflected tube wave corresponding to the first tube wave reflecting off a first known obstacle in the wellbore, wherein the first known obstacle includes features that cause impedance discontinuity between the first tube wave and the first reflected tube wave;
        determining a first reference point along the fiber optic cable that corresponds to a location along the fiber optic cable where the first tube wave reflected off the first known obstacle to form the first reflected tube wave;
        associating the first reference point along the fiber optic cable with a known location of the first known obstacle, wherein the known location is based at least in part by a known design of a casing string in the wellbore;
    determining an uncertainty magnitude of the first reference point; and
    applying a weight to data collected by the fiber optic cable at the first reference point during interpretation of the data in the downhole application,
    wherein the weight applied to the data collected by the fiber optic cable at the first reference point is based at least in part on the uncertainty magnitude of the first reference point.

2. The method of claim 1, further comprising:
    creating an image of the first reflected tube wave based at least in part on data received by the fiber optic cable; and
    determining a local maximum of the image of the first reflected tube wave, wherein the local maximum corresponds to the first reference point along the fiber optic cable.

3. The method of claim 2, further comprising:
    determining a variance associated to the local maximum of the image of the first reflected tube wave, wherein the uncertainty magnitude is based at least in part on the variance associated to the local maximum of the image of the first reflected tube wave.

4. The method of claim 1, the step of calibrating the fiber optic cable further comprising:
    interpolation or extrapolation of additional reference points along a length of the fiber optic cable based at least in part on the uncertainty magnitude of the first reference point for calibrating the fiber optic cable along the length of the fiber optic cable.

5. The method of claim 1, wherein the first known obstacle is at least one of a casing joint, a change in diameter of a casing string, or a top level of fluid within the casing string.

6. The method of claim 1, wherein the weight applied to the data collected by the fiber optic cable at the first reference point increases as the uncertainty magnitude of the first reference point decreases.

7. The method of claim 1, the step of calibrating the fiber optic cable further comprising:
    associating an initial reference point along the fiber optic cable with a known location of a perforation made for exciting the first tube wave.

8. The method of claim 1, the step of calibrating the fiber optic cable further comprising:

detecting, by the fiber optic cable a second reflected tube wave corresponding to a second reflection of the first tube wave off a second known obstacle;

determining, a second reference point along the fiber optic cable that corresponds to a location along the fiber optic cable where the first tube wave reflected off the second known obstacle to form the second reflected tube wave; and associating the second reference point along the fiber optic cable with a location of the second known obstacle.

9. The method of claim 8, further comprising:

determining a second uncertainty magnitude of the second reference point; and applying a second weight to data collected by the fiber optic cable at the second reference point during interpretation of the data in the downhole application, wherein the second weight applied to the data collected by the fiber optic cable at the second reference point is based at least in part on the second uncertainty magnitude.

10. The method of claim 9, the step of calibrating the fiber optic cable further comprising:

detecting, by the fiber optic cable at a third reference point along the fiber optic cable, a third reflected tube wave corresponding to a reflection of the first tube wave off a third obstacle;

determining a location along a casing string corresponding to the third obstacle; and associating the third reference point along the fiber optic cable with the location of the third obstacle for calibrating the fiber optic cable.

11. The method of claim 10, the step of calibrating the fiber optic cable further comprising:

detecting, by the fiber optic cable a third reflected tube wave corresponding to a third reflection of the first tube wave off a third obstacle;

determining, a third reference point along the fiber optic cable that corresponds to a location along the fiber optic cable where the first tube wave reflected off the third obstacle to form the third reflected tube wave; and associating the third reference point along the fiber optic cable with a location of the third obstacle.

12. The method of claim 1, the step of calibrating the fiber optic cable further comprising:

monitoring a second tube wave in the wellbore;

detecting, by the fiber optic cable a second reflected tube wave corresponding to a reflection of the second tube wave off a second known obstacle;

determining, a second reference point along the fiber optic cable that corresponds to a location along the fiber optic cable where the second tube wave reflected off the second known obstacle to form the second reflected tube wave; and associating the second reference point along the fiber optic cable with a location of the second known obstacle, wherein the known location is based at least in part by a known design of the casing string in the wellbore.

13. The method of claim 12, wherein the first tube wave and the second tube wave originate from the same location in the wellbore.

14. The method of claim 13, wherein the first known obstacle and the second known obstacle are the same obstacle.

15. A method of forming a calibrated fiber optic cable and processing data from the calibrated fiber optic cable for use in a wellbore system comprising:

detecting a first reflected tube wave along a length of the fiber optic cable, corresponding to a reflection of a first tube wave off a first known obstacle, wherein the first known obstacle includes features that cause impedance discontinuity between the first tube wave and the first reflected tube wave;

determining a first reference point along the fiber optic cable corresponding to a known location where the first tube wave reflected off the first known obstacle to produce the first reflected tube wave;

associating the first reference point along the fiber optic cable with a known location of the first known obstacle within the wellbore for defining a first calibrated reference point;

detecting a second reflected tube wave along the length of the fiber optic cable, corresponding to a reflection of a second tube wave off a second known obstacle;

determining a second reference point along the fiber optic cable corresponding to a known location where a second tube wave reflected off the second known obstacle to produce the second reflected tube wave;

associating the second reference point along the fiber optic cable with a known location of the second known obstacle for defining a second calibrated reference point;

estimating additional reference points along the length of the fiber optic cable between the first reference point and the second reference point;

processing, by a computing device, data from the calibrated fiber optic cable by applying a weight to the data received from the calibrated fiber optic cable, wherein the weight corresponds to an uncertainty value associated with a particular location along the length of the calibrated fiber optic cable.

16. The method of claim 15, further comprising:

computing an image of the first reflected tube wave;

computing an image of the second reflected tube wave;

wherein the first reference point along the fiber optic cable corresponds to a first local maximum of the image of the first reflected tube wave, and wherein the second reference point along the fiber optic cable corresponds to a second local maximum of the image of the second reflected tube wave.

17. The method of claim 16, further comprising:

determining an uncertainty value of the first reference point, wherein the uncertainty value corresponds to a variance associated with the first local maximum of the image of the first reflected tube wave; and determining an uncertainty value of the second reference point, wherein the uncertainty value corresponds to a variance associated with the second local maximum of the image of the second reflected tube wave.

18. The method of claim 17, the step of estimating additional locations along the length of the fiber optic cable between the first reference point and the second reference point further comprising: extrapolating or interpolating estimates for the additional locations along the length of the fiber optic cable based at least in part on the first reference point and the second reference point.

19. The method of claim 18, wherein computing the image of the first reflected tube wave, computing the image of the second reflected tube wave, and estimating additional location along the length of the fiber optic cable is performed in an iterative manner.

* * * * *